United States Patent Office 2,724,718
Patented Nov. 22, 1955

2,724,718

PREPARATION OF PHOSPHORUS-CONTAINING ORGANIC COMPOUNDS

Alan R. Stiles, Denham Harman, and Frederick F. Rust, Berkeley, Calif., assignors to Shell Development Company, San Francisco, Calif., a corporation of Delaware No Drawing. Application April 12, 1948,
Serial No. 20,608

19 Claims. (Cl. 260—461)

This invention relates to the production of phosphorus-containing organic compounds many of which are novel compositions of matter that could not be economically prepared by the methods heretofore employed to produce phosphorus compounds. More particularly the invention provides a novel general reaction by which organic phosphonates and phosphinates as well as their acids and salts may be prepared in a single operational step from low cost and readily available starting materials.

Numerous derivatives of organic phosphonic and phosphinic acids are known to exist and to have a considerable commercial value as well as a great variety of useful applications. For example, organic phosphonates and phosphinates as well as their acids and salts are effective wetting agents and detergents, plasticizers for many plastics and resins, bonding agents for asphalt and similar compositions, lubricants and lubricant additives, corrosion inhibitors, flame proofing agents, general agricultural and household chemicals including insecticides, pesticides, and the like.

Because of their great commercial value, many methods of preparing organic phosphinates and phosphonates have been advanced. The methods heretofore employed vary widely in their individual operational steps, but substantially all of them employ the reactions of phosphorus-halogen compounds to attain carbon-to-phosphorus bonds. While it has long been known to be possible to form such bonds by reacting alkyl halides with phosphine, or by the use of Grignard reagents, such methods are not feasible in commercial scale operations. It is also known that certain aromatic phosphonates and phosphinates can be obtained by heating benzene with phosphorus trichloride in the presence of aluminum chloride or by passing the mixed vapors through a red hot tube thus forming the derivative of phosphine, phenyl phosphorus dichloride. The dichloride can be hydrolyzed to the phosphinic acid, which, in turn can be oxidized by hydrogen peroxide or other oxidizing agents to the phosphonic acid. This method, however, is not well suited for the production of the aliphatic compounds. Perhaps the most general method heretofore known for producing phosphonates or phosphinates involves the reaction of phosphorus trichloride with an alcohol or preferably an alkali metal alcoholate to form a trialkyl phosphite and the isomerization of the phosphite to a dialkyl phosphonate by reaction with an alkyl halide. The above reaction process is complex and the yields were reported by Arbuzov, J. Gen. Chem. (USSR) 4, 898–900 (1934) critically to depend upon the size and structure of the alkyl radical, the character of the halide, the quantities employed, and the temperature of the reaction. Later work by Kharash, Jensen and Urry, J. Am. Chem. Soc. 67, 1864 (1945), and U. S. Patent 2,425,766, indicates that phosphorus trichloride or phosphorus pentachloride may be added to olefines to form compounds such as RCHClCH₂PCl₂ or RCHClCH₂PCl₄ from which unsaturated phosphonates can then be formed by treating the phosphorus-containing alkyl halides with phosphorus pentoxide. Phosphorus trichloride is also known to add to the double bonds of a carbonyl compound and a limited class of phosphorus-containing compounds, the alpha-hydroxyalkanephosphonates, may be prepared via this reaction followed by hydrolysis.

However, the problem of producing phosphonates or phosphinates by a practical reaction process which is applicable to the production of compounds having a variety of structures has heretofore remained unsolved.

A principal object of the present invention is therefore the provision of a general method for the production of such compounds, i. e., organic compounds containing in their molecules one or more phosphorus atoms having a co-ordination number of four and having at least one of the co-ordination positions filled by a carbon atom and one filled by an oxygen atom bound only to phosphorus. Another object is to provide a method of preparing organic phosphonates and phosphinates by a single operational step necessarily employing only a compound containing olefinic double bonds and a compound containing the group (H—P→O). Still other objects and advantages of the present invention will be apparent from the following description.

We have now discovered that the class of compounds containing in their molecules the grouping (H—P→O) i. e., compounds containing a phosphorus atom having a co-ordination number of four and having one of the co-ordinate positions occupied by a hydrogen atom, one by an oxygen atom bonded only to phosphorus and the remainder filled by monovalent atoms or by polyvalent atoms having all but one of their valencies satisfied by other groups or atoms, undergo a unique reaction of a general nature. When a compound containing the (H—P→O) group is present in the same phase of a reaction system with an organic compound containing an olefinic double bond and is contacted by a free radical a reaction is initiated between the compound containing the (H—P→O) group and the olefinic compound, resulting in the formation of compounds containing the grouping (C—C—P→O) in which the remaining valencies of carbon and phosphorus are satisfied by monovalent atoms or groups.

Illustrative examples of compounds containing the (H—P→O) group which may suitably be employed in the present process include hypophosphorus acid, sodium hypophosphite, calcium hypophosphite, ammonium hypophosphite, ethyl hypophosphite, cyclohexyl hypophosphite, benzyl hypophosphite, tolyl hypophosphite, butyl propane-2-phosphinate, butanephosphinic acid, ammonium benzenephosphinate, phosphorus acid, potassium acid phosphite, lithium phosphite, barium phosphite, mono-tertiary-butyl phosphite, diisoamyl phosphite, monotolyl phosphite, dibutyl phosphite and the like.

A generally preferred class of compounds containing the (H—P→O) group consists of compounds of the general formula

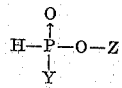

in which Z represents a monovalent hydrocarbon radical free of aliphatic multiple bonds, or a monovalent inorganic cation, and Y represents a hydrogen atom, a monovalent hydrocarbon radical free of aliphatic multiple bonds, or the group —OZ in which Z is as defined above. Illustrative examples of the preferred class of compounds containing the (H—P→O) group include the salts of hypophosphorous acid such as sodium hypophosphite, the hydrocarbyl esters of hypophosphorous acid, such as butyl hypophosphite, the hydrocarbyl esters of organic phosphinic acids such as propyl hexanephosphinate, the monohydrocarbyl esters of phosphorous acid, such as monobutyl phosphite, the dihydrocarbyl esters of phosphorous acid such as dibutyl phosphite, and the salts of phosphorous acids such as sodium phosphite.

A particularly preferred subclass of compounds containing (H—P→O) group for the preparation of organic phosphinates comprises the ammonium and alkali metal salts of hypophosphorous acid, e. g., ammonium, sodium, potassium or lithium hypophosphite. We have found that sodium hypophosphite may be directly added to olefines containing as many as 14 carbon atoms to produce in a single operational step a water soluble detergent in substantially quantitative yields.

A particularly preferred subclass of compounds containing the (H—P→O) group for the preparation of organic phosphonates comprises the dialkyl phosphites in which each alkyl radical contains up to about eight carbon atoms, e. g., diethyl, dipropyl, dibutyl and the like phosphites. By varying the mole ratio of olefin to phosphite we have found that the dialkyl phosphites can be caused to undergo addition reactions whereby one phosphite ester group becomes attached to an organic radical composed of from 1 to 3 or more molecules of the olefin. In referring in the specification and claims to phosphorus-containing compounds containing the grouping (H—P→O), it is recognized that the formulas frequently may be written in a manner that may indicate that the phosphorus atom is in the trivalent state. It is known that phosphorus-containing acids and derivatives thereof, having a hydroxyl group directly attached to a trivalent atom of phosphorus, such as dialkyl phosphites, generally are in equilibrium with a tautomeric form in which the phosphorus atom is in the state frequently referred to as the pentavalent state and in which the group (H—P→O) is present. In referring to compounds containing the (H—P→O) grouping, we intend to include phosphorus-containing compounds which in such tautomeric form contain the grouping (H—P→O), such as dialkyl phosphites, although their formulas customarily may be written to indicate the presence of trivalent phosphorus to which is bonded at least one hydroxyl group.

Compounds containing the (H—P→O) group may be added in accordance with the present process to any organic compound stable at temperatures above about 0° C. and containing one or more olefinic double bonds capable of undergoing addition reactions. Illustrative examples of unsaturated compounds which are suitable for employment in the process include; allyl alcohol, diallyl ether, acrylic acid, diallyl sulfide, 1-butene, 2-hexene, cyclohexene, styrene vinyl methyl ether, 1,4-pentadiene, cyclohexadiene, 1-octene, propylene, isobutylene, diisobutylene, beta or gamma-chlorallyl alcohol, 1,3-dichloropropene, crotyl mercaptan, 1,3,3-trimethyl-1-cyclohexene, cyclopentene, alpha-methylstyrene, and the like.

"Olefinic compounds," i. e., the olefinic bond-containing compounds defined in the preceding paragraph, which have been found generally preferable for the present process comprise members of the group consisting of hydrocarbons, ethers, alcohols, sulfides, disulfides and esters containing one or more olefinic bonds, of which the alkenes, dialkenyl ethers, alkenols and alkyl alkenoates are particularly preferred since their employment results in the substantial absence of side reactions.

Illustrative examples of the preferred olefinic compounds include, hydrocarbons such as butene, heptene, decene, cyclohexene, butenylbenzene, cyclopentene, styrene and eicosene; ethers such as diallyl ether, vinyl butyl ether, dipentenyl ether, allyl cyclohexyl ether, diheptenyl ether, vinyl benzyl ether, methyl cyclohexenyl ether, butyl para-vinylphenyl ether and diisopropenyl ether; alcohols such as allyl alcohol, crotyl alcohol, tiglyl alcohol, cyclohexenol, oleyl alcohol and 2-eicosen-1-ol; and esters such as ethyl crotonate, butyl pentenoate, methyl cinnamate, allyl acetate, cyclohexenyl benzoate, and vinyl stearate.

Olefins have a special suitability in the present process in that they provide low cost starting materials from which valuable compounds are obtained by the present process. It has been found that the 1-olefins exhibit a somewhat higher rate of reaction in the present process than do the other olefins.

The addition reaction is initiated by the presence of free radicals in intimate contact with the reactants. Free radicals are a relatively new class of extremely reactive organic compositions. They have been defined in a recent text as "complexes of abnormal valency which possess additive properties but do not carry an electrical charge and are not ions." Certain free radicals are comparatively stable, the tri-para-tolylmethyl radicals, for example, are capable of independent existence for a period of hours in a pentane solution. It is therefore possible to initiate an addition reaction with such free radicals by combining the reactants and adding to the mixture a quantity of free radicals.

A generally preferred method of conducting the present process comprises forming free radicals within the phase of the reaction system in which the compound containing the (H—P→O) group and the olefinic compound are copresent. The free radicals are formed either by thermochemically or photochemically dissociating a component of this phase. As substantially any organic compound will absorb light radiations of some frequency, in certain cases it is possible to initiate the reaction between the phosphorus compound and the olefinic compound by simply combining them and subjecting the mixture to light radiations of a frequency at which the phosphorus compound is dissociated into free radicals. However, it is more efficient and is conducive to a better control of the reaction to incorporate a compound which will be designated herein as a "reaction initiator" as the source of the free radicals.

Suitable reaction initiators for the present process comprise compounds which at temperatures between about 0° C. and 200° C. are readily dissociated into free radicals under the influence of actinic light, or which readily dissociate under the influence of a temperature within the above range even in the absence of actinic light. The property of dissociating into free radicals under the conditions defined is a property of a particular compound, the existence or non-existence of which is determinable by those skilled in the art. Illustrative examples of compounds possessing such properties include the positive halogen compounds such as calcium hypochlorite, sodium N-chloro-p-toluenesulfonamide and sodium N-chlorobenzenesulfonamide, metallo - alkyl compounds such as lead tetraethyl and lead tetraphenyl, carbonyl compounds such as acetone, methyl ethyl ketone, and benzaldehyde and the organic peroxides such as di-tertiary-butyl peroxide, tertiary-butyl hydroperoxide, tertiary-butyl perbenzoate, 2,2-bis(tertiary-butylperoxy)butane and benzoyl peroxide.

The amount of reaction initiator employed may be varied over wide limits depending upon the character of the particular initiator. Where a solvent such as acetone is employed to initiate the reaction by its photochemically induced dissociation, it may be employed in relatively high proportions, thus acting as a solvent for the reactants, and the reaction may be controlled by the strength and amount of light (within the dissociation band of acetone) to which the solution is subjected. In general, from about 0.5 mole per cent to 10 mole per cent of reaction initiator based on the phosphorus compound is suitable.

In addition to the reaction initiator, solvents may suitably be copresent in the reaction system. In general, substantially any of the commonly employed oxygenated or hydrocarbon solvents which are free of aliphatic multiple bonds may be employed. The lower alkanols such as methanol, ethanol and the like, as well as liquid paraffins such as pentane and heptane, and aromatic hydrocarbons such as benzene and toluene, have been found to be particularly suitable. The lower carbonyl compounds may be employed both as a solvent and a reaction initiator since carbonyl compounds, acetone for example, are readily dissociated into free radicals by actinic light.

The compounds containing the (H—P→O) group are comparatively non-volatile materials and it is therefore generally preferable to conduct the process in the liquid phase, and it is, of course, most economical to employ normal atmospheric pressure. However, whenever a component of the mixture is volatile at the temperature at which it is desired to conduct the reaction, superatmospheric pressures may be used. Similarly, in certain cases, for example where a vapor phase reaction is desired, reduced pressure may be suitably employed and vapor phase operation obtained by the use of relatively high temperatures and a reaction initiator suitable for the vapor phase dissociation into free radicals.

In general, temperature does not critically determine the occurrence or non-occurrence of the free radical addition of the compound containing the (H—P→O) group to the olefinic compound. The addition may be suitably accomplished at temperatures from as low as 0° C. to a temperature at which the reactants or other addition products are decomposed. However, as chemical reactions in general occur at a more rapid rate at elevated temperature, it has been found particularly conducive to high yields to employ temperatures between about 50° C. and about 150° C.

The rate at which free radicals are introduced or formed within the reaction mixture has been found to determine more critically the overall rate of the addition reaction. As the photochemical dissociation of a compound into free radicals is substantially independent of temperature where a photochemically dissociable reaction initiator is used, the reaction may be suitably conducted at any temperature, but is preferably conducted at temperatures of from about 0° C. to 200° C. Where a thermochemically dissociable reaction initiator is employed the reaction temperature critically affects the rate of its dissociation and thus critically affects the rate at which free radicals are formed in the reaction mixture which in turn controls, within limits, the rate of the addition reaction. The attainment of an optimum rate of addition when the reaction is initiated by a thermochemically dissociable reaction initiator therefore depends upon the use of an initiator which undergoes its most efficient dissociation at a temperature at which the compound containing the (H—P→O) group most rapidly adds to the olefinic compound employed.

Thermochemically dissociable reaction initiators are generally preferred, and the organic peroxides form a particularly preferred subclass of thermochemically dissociable reaction initiators since they are readily available and provide in each case a convenient means of introducing free radicals into the reaction system at a rapid but controllable rate at some temperature within the generally preferred limits of from about 0° C. to 200° C. In addition, the use of an organic peroxide avoids the necessary employment of specialized reaction vessels adapted for the transmission of light.

U. S. Patent No. 2,379,218 describes numerous suitable organic peroxides and the recommended temperature ranges for their use, including:

| | |
|---|---|
| Diethyl percarbonate | 45 to 70° C. |
| Allyl percarbonate | 50 to 80° C. |
| Benzoyl peroxide | 70 to 80° C. |
| Acetyl peroxide | 70 to 90° C. |
| beta-Chlorobenzoyl peroxide | 85 to 95° C. |
| Methyl n-amyl ketone peroxide | 110 to 135° C. |
| Methyl isobutyl ketone peroxide | 110 to 135° C. |
| Methyl n-propyl ketone peroxide | 115 to 140° C. |
| Methyl ethyl ketone peroxide | 115 to 140° C. |
| Acetone peroxide | 125 to 150° C. |
| Ethyl peroxide | 125 to 145° C. |
| Methyl isobutyl peroxide | 130 to 150° C. |
| Dicyclohexyl peroxide | 150° C. |

An especially suitable class of organic peroxides for employment as the reaction initiator for the present process is the class of organic peroxides containing at least one carbon atom linked to three carbon atoms and to the peroxy group (—O—O—) and having dissociation temperatures within the range of from about 0° C. to 200° C. It has been found that certain organic peroxides of this class have an unusual stability with respect to physical shock and conditions of storage which in the case of certain organic peroxides of different structures would cause a serious danger of explosion. Examples of organic peroxides having the above defined structure include, peresters such as di-tertiary-butyl diperoxalate (recommended range 0° C. to 40° C.), di-tertiary-butyl dipermalonate (recommended range 20° C. to 60° C.) and tertiary-butyl perbenzoate (recommended range 75° C. to 115° C.); di-tertiary-alkyl peroxides such as di-tertiary-butyl peroxide (recommended range 115° C. to 150° C.), and tertiary-alkylperoxyalkanes such as 2,2-bis(tertiary-butylperoxy)butane (recommended range 80° C. to 120° C.).

The addition process of the present invention may be conducted as a continuous or a batchwise process, and in general the unreacted portions of the reactants may be readily recovered and recycled. The process is general in nature and may be readily adapted for the employment of the reactants which normally exist in the solid, liquid or vapor state by the employment of elevated pressures and/or solvents as described above. The molecular weight or number of atoms of a particular compound containing the (H—P→O) group or an olefinic compound is in general not critical, it being essential only that the compound is stable within the range of generally suitable temperatures and capable of undergoing reactions characteristic of the various defined structural groupings. Olefinic compounds and compounds containing the (H—P→O) group composed of up to about 20 atoms are therefore suitable for employment in the process. The process has a unique economic advantage in that in general any type of apparatus may be used, the reactants are non-corrosive and in many cases the vessel may simply comprise a means of retaining and if necessary heating a liquid.

In addition to providing a general method suitable for the formation of valuable phosphonates and phosphinates from olefinic compounds containing large numbers of carbon atoms the process provides a method of preparing such compounds of high carbon atom content from olefinic compounds containing fewer carbon atoms. For example, by the present process 1-hexene has been converted to alkanephosphonates of 6, 12 and 18 carbon atoms, respectively. The number of the molecules of the olefinic compound which may be caused to combine with a single molecule of the compound containing the (H—P→O) group may in each case, particularly where the compound containing the (H—P→O) group is a dialkyl phosphite, be controlled by the molar ratio of the olefinic compound to the compound containing the (H—P→O) group. Where a mole-to-mole addition is desired it is generally preferable to employ the reactants in about equimolar proportions or with the compound containing the (H—P→O) group in excess and where it is desirable to cause more than one mole of the olefinic compound to be incorporated in the product it is preferable to employ about a 2 or 3 to 1 molar excess of the olefinic compound.

The following examples illustrate the details of applying the present process to a reaction between various individual compounds containing the (H—P→O) group, as well as various olefinic compounds and the use of thermochemically or photochemically dissociable reaction initiators. As many variations in the reactants and reaction conditions are within the scope of the invention, the examples are presented for the purposes of illustration only and the invention is not limited to the particular reactants or reaction conditions described in them.

Example I.—Preparation of sodium octane-1-phosphinate

A reaction mixture comprising 0.4 mole sodium hypophosphite (42.4 grams), 0.4 mole 1-octene (44.8 grams), 100 mls. of methanol as a solvent and 0.0018 mole 2,2-bis-(tertiary-butylperoxy)butane (0.43 gram) as a reaction initiator was placed in a closed, pressure-resistant vessel (a stainless steel hydrogenation bomb). The vessel was maintained at 120° C. for two hours while being constantly agitated. At the end of this time the reaction products were found to comprise a single phase colorless liquid. Dilution of the liquid to 500 mls. with water caused no phase separation indicating that 100% of the olefin had been converted to the water soluble sodium octane-1-phosphinate.

Example II.—Preparation of sodium tetradecane-1-phosphinate

The reaction was conducted by the same procedure described above, merely replacing the 1-octene with an equimolecular amount of 1-tetradecene. A single phase reaction product was obtained at the end of 2 hours from which, by precipitation with acetone, a white powder amounting to 80% of the combined weight of the reactants was obtained. The powder which was soap-like and exhibits detergent properties was indicated by the following analysis to be sodium tetradecane-1-phosphinate,

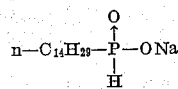

|  | Found | Calculated for $C_{14}H_{30}O_2PNa$ |
|---|---|---|
| Percent C | 60.4, 60.4 | 59.2 |
| Percent H | 11.1, 11.2 | 10.6 |
| Percent P | 9.6, 9.6 | 10.9 |

Examples III–V.—Preparation of dialkyl alkane-1-phosphonates

The following compounds containing the (H—P→O) group and olefins were caused to react by agitating a reaction mixture containing them in the respective molecular proportions in the presence of di-tertiary-butyl peroxide as a reaction initiator in an amount corresponding to 5 mole per cent based on the weight of the (H—P→O) compound for 16 hours at 120° C.

III. 1-hexene (1.2 moles) + diethyl phosphite (0.7 mole).
IV. 1-octene (0.2 mole) + dibutyl phosphite (0.1 mole).
V. 1-decene (0.2 mole) + dibutyl phosphite (0.1 mole).

Two main reaction products were obtained from each reaction, corresponding to the addition product of 1 mole of the compound containing the group with, respectively, 1 and 2 moles of the olefin. The various dialkyl alkanephosphonates and the analytical data by which they were characterized are listed in the following table.

Example VI.—Initiating the reaction by photochemically produced free radicals A reaction mixture comprising 1 mole of 1-octene, 1 mole of dibutyl phosphite and 8.9 mole per cent of acetone based on the phosphite was exposed for 7 hours at 25° C. to a source of ultraviolet light. The refractive index rose from $n\ 20/D\ 1.4150$ to $n\ 20/D\ 1.4397$ and by a vacuum distillation of the reaction product, dibutyl octane-1-phosphonate B. P. 1.0 mm. 146–152° C. in a yield of 54.5% based on the input phosphite and a residue boiling above 152° C. at 1 mm. pressure in a yield of 19% were recovered.

Dibutyl octane-1-phosphonate was identified by the following analysis:

|  | Found | Calculated for $C_{16}H_{35}O_3P$ |
|---|---|---|
| Percent P | 9.9(5), 9.8(9) | 10.17 |
| Percent C | 62.50, 62.63 | 62.5 |
| Percent H | 11.4, 11.49 | 11.8 |
| M. W. | 304±12 | 307 |

The following analysis indicated that the residue consisted primarily of dibutyl 2-hexyldecane-1-phosphonate and dibutyl alkanephosphonates composed of more than two octane units.

|  | Found | Calculated for $C_{21}H_{51}O_4P$ |
|---|---|---|
| Percent P | 8.50, 8.50 | 7.4 |
| Percent C | 65.98, 65.82 | 68.7 |
| Percent H | 11.66, 11.73 | 12.4 |
| M. W. | 516±20 | 419 |

Example VII.—Preparation of alkyl esters of aliphatic ethers containing one or more phosphono groups A reaction mixture comprising 0.16 mole of diallyl ether, 0.32 mole of dibutyl phosphite and 4.0 mole per cent of di-tertiary-butyl peroxide was placed in a closed vessel and heated. A temperature of 130° C. was maintained for about 16 hours. The reaction mixture was subjected to a vacuum distillation to a still head temperature of 107° C. at a pressure of 10 mm., and the residue subjected to a molecular distillation at 156° C. and $1 \times 10^{-5}$ mm. of mercury.

The following analysis indicated that the principal products, recovered in a 28% yield, were a mixture of bis(dibutyl 3-phosphonopropyl) ether and dibutyl 3-phosphonopropyl allyl ether.

|  | Found | Calculated for— | |
|---|---|---|---|
|  |  | $C_{14}H_{28}O_4P$ | $C_{22}H_{48}O_7P_2$ |
| Percent C | 54.39, 54.44 | 57.5 | 54.4 |
| Percent H | 9.44, 9.42 | 9.9 | 9.9 |
| Percent P | 11.9, 11.9 | 10.6 | 13.2 |
| M. W. | 320±15 | 292 | 486 |

| Example | Product | Yield [1] | B. P. | $n\ 20/D$ | Percent Phosphorus | |
|---|---|---|---|---|---|---|
|  |  |  |  |  | Found | Theory |
| III | Diethyl hexane-1-phosphonate | 42 g. (29%) | 126° C./10 mm | 1.4297 | 13.2 / 13.5 | 13.5 |
|  | Diethyl 2-butyloctane-1-phosphonate | 37.5 g. (17.5%) | Molecular Distillation 100° C. | 1.4466 | 9.26 / 9.27 | 10.1 |
| IV | Dibutyl octane-1-phosphonate | 6.5 g. (21.2%) | 146–9° C./1 mm | 1.4394 | 9.9 | 10.1 |
|  | Dibutyl 2-hexyldecane-1-phosphonate | 9.0 g. (21.5%) | Molecular Distillation 100° C. | 1.4463 | 8.0 (5) | 7.4 |
| V | Dibutyl decane-1-phosphonate | 8.5 g. (25.2%) | 157° C./1 mm | 1.4426 | 8.8 / 8.8 | 9.3 |
|  | Dibutyl 2-octyl-dodecane-1-phosphonate | 12.0 g. (25.2%) | Molecular Distillation 155° C. | 1.4533 | 5.8 (7) / 5.9 (0) | 6.54 |

[1] Based on input phosphite.

Example VIII.—Preparation of dialkyl carboalkoxyalkanephosphonates

A reaction mixture comprising 0.15 mole of ethyl crotonate, 0.30 mole of dibutyl phosphite and 5 mole per cent of di-tertiary-butyl peroxide based on the phosphite were heated in a closed vessel. A temperature of 130° C. was maintained for about 16 hours. The unconverted reactants and volatile components of the reaction mixture were removed by a vacuum distillation to a still head temperature of 135° C. under a pressure of 1 mm.

The following analysis indicated the principal reaction products, obtained in about 30% yield, to be the dibutyl carboethoxypropanephosphonates:

$$\begin{array}{c} C_4H_9O \quad O \quad CH_3 \\ \diagdown \uparrow \quad | \\ P-CH-CH_2-COOCH_2-CH_3 \\ \diagup \\ C_4H_9O \end{array}$$

dibutyl 1-carboethoxypropane-2-phosphonate and $$\begin{array}{c} CH_3 \\ | \\ C_4H_9O \quad O \quad CH_2 \\ \diagdown \uparrow \quad | \\ P-CH-COOCH_2-CH_3 \\ \diagup \\ C_4H_9O \end{array}$$

dibutyl 1-carboethoxypropane-1-phosphonate

|  | Found | Calculated for $C_{14}H_{29}O_5P$ |
|---|---|---|
| Percent C | 53.0, 53.1 | 54.6 |
| Percent H | 9.3, 9.3 | 9.4 |
| Percent P | 9.6, 9.9 | 10.1 |

Example IX.—Preparation of a dialkyl hydroxyalkane-1-phosphonate

1. A DIBUTYL PHOSPHONATE

A reaction mixture comprising 0.15 mole of allyl alcohol, 0.3 mole of dibutyl phosphite and 5 mole per cent of di-tertairy-butyl peroxide based on the amount of the phosphite was heated in a closed vessel. A temperature of 130° C. was maintained for about 16 hours. The unconverted reactants and volatile components of the reaction mixture were removed by a vacuum distillation to a still head temperature of 70° C. at a pressure of 1 mm.

The following analysis indicated the principal reaction product, obtained in about 30% yield based on the weight of the alcohol to be dibutyl 3-hydroxypropane-1-phosphonate.

$$\begin{array}{c} C_4H_9O \quad O \\ \diagdown \uparrow \\ P-CH_2-CH_2-CH_2-OH \\ \diagup \\ C_4H_9O \end{array}$$

|  | Found | Calculated for $C_{11}H_{25}O_4P$ |
|---|---|---|
| Percent C | 46.4, 46.5 | 52.4 |
| Percent H | 9.2, 9.2 | 9.9 |
| Percent P | 16.4, 16.4 | 12.3 |
| OH value in equivalents/100 grams | 0.33 | 0.4 |
| Refractive index n 20/D | 1.4478 |  |

2. A DIPROPYL PHOSPHONATE

A reaction mixture comprising 0.15 mole of allyl alcohol, 0.3 mole of dipropyl phosphite and 5 mole per cent of di-tertiary-butyl peroxide based on the amount of phosphite was heated in a closed vessel. A temperature of 130° C. was maintained for 16 hours. The unconverted reactants and volatile components of the reaction mixture were removed by a vacuum distillation to a still head temperature of 80° C. at a pressure of 1 mm.

The following analysis indicated the principal reaction product, obtained in about a 30% yield based on the weight of the alcohol to be dipropyl 3-hydroxypropane-1-phosphonate.

|  | Found | Calculated for $C_9H_{21}O_4P$ |
|---|---|---|
| Percent C | 43.4, 43.5 | 48.2 |
| Percent H | 8.3, 8.6 | 9.4 |
| Percent P | 17.89, 17.9 | 13.8 |
| M. W. | 369 | 224 |

Example X.—Preparation of phosphonates containing disulfide groups

Compounds having the formulae, $$\begin{array}{c} C_4H_9O \quad O \qquad\qquad\qquad\qquad\qquad\qquad O \quad O-C_4H_9 \\ \diagdown \uparrow \qquad\qquad\qquad\qquad\qquad\qquad\qquad \uparrow \diagup \\ P-CH_2-CH_2-CH_2-S-S-CH_2-CH_2-CH_2-P \\ \diagup \qquad\qquad\qquad\qquad\qquad\qquad\qquad\qquad \diagdown \\ C_4H_9O \qquad\qquad\qquad\qquad\qquad\qquad\qquad\qquad O-C_4H_9 \end{array}$$

and $$\begin{array}{c} O \quad OC_4H_9 \\ \uparrow \diagup \\ CH_2=CH-CH_2-S-S-CH_2-CH_2-CH_2-P \\ \diagdown \\ OC_4H_9 \end{array}$$

will be produced by heating a reaction mixture comprising 1 mole of diallyl disulfide, 2 moles of dibutyl phosphite and 0.1 mole of ditertiary-butyl dipermalonate at about 55° C. for 8 hours with constant agitation. The phosphonate produced may be recovered by a fractional distillation or by a chemical separation of the reaction mixture.

Example XI.—Preparation of a dialkyl cycloalkanephosphonate

A reaction mixture comprising 0.20 mole of cyclohexene, 0.40 mole of dibutyl phosphite and 3 mole per cent of di-tertiary-butyl peroxide based on the amount of phosphite was heated in a closed vessel. A temperature of 130° C. was maintained for about 16 hours. The unconverted reactants and volatile reaction products were removed by a vacuum distillation. The fraction boiling from 134° C. to 140° C. at 1 mm. pressure, recovered in a 40% yield was indicated by the following analysis to consist primarily of dibutyl cyclohexanephosphonate:

|  | Found | Calculated for $C_{14}H_{29}O_3P$ |
|---|---|---|
| Percent C | 60.5, 60.6 | 60.9 |
| Percent H | 10.7, 10.6 | 10.5 |
| Percent P | 11.1, 11.2 | 11.2 |
| M. W. | 275 | 276 |

The phosphonate ester was hydrolyzed by the introduction of dry hydrogen chloride at a temperature from 150° C. to 200° C. into the crude reaction product. The hydrolysis product was identified as cyclohexanephosphonic acid by the following analysis:

|  | Found | Calculated for $C_6H_{13}O_3P$ |
|---|---|---|
| Percent C | 44.0, 44.1 | 43.9 |
| Percent H | 8.0, 8.2 | 7.9 |
| Percent P | 18.6(1), 18.6(4) | 18.9 |
| M. P. | 159–60° C. uncon. |  |

Example XII.—Preparation of alkali metal phosphinates containing sulfide groups Compounds having the formulae, $$\begin{array}{c} O \qquad\qquad\qquad\qquad\qquad\qquad\qquad O \\ \uparrow \qquad\qquad\qquad\qquad\qquad\qquad\qquad \uparrow \\ NaO-P-CH_2-CH_2-CH_2-S-CH_2-CH_2-CH_2-P-ONa \\ | \qquad\qquad\qquad\qquad\qquad\qquad\qquad\qquad\qquad | \\ H \qquad\qquad\qquad\qquad\qquad\qquad\qquad\qquad\qquad H \end{array}$$

and $$\begin{array}{c} O \quad ONa \\ \uparrow \diagup \\ CH_2=CH-CH_2-S-CH_2-CH_2-CH_2-P \\ \diagdown \\ H \end{array}$$

will be produced by heating a reaction mixture comprising 1 mole of diallyl sulfide, 2 moles of sodium hypophosphite and 0.1 mole of di-tertiary-butyl peroxide at 120° C. for about 8 hours. The phosphinates produced may be separated as the residue remaining after a vacuum distillation of the reaction products.

*Example XIII.—Preparation of phosphonates containing sulfide groups*

Compounds of the formulae,

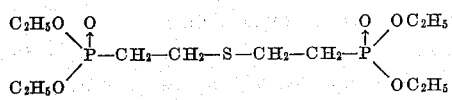

and

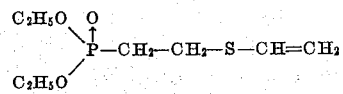

will be produced by heating a mixture of 1 mole of divinyl sulfide, 2 moles of diethyl phosphite and 0.1 mole of di-tertiary-butyl dipermalonate at 40° C. for about 8 hours. The phosphonate esters produced may be separated as the residue remaining after a vacuum distillation of the reaction products.

*Example XIV.—Preparation of phosphinic acid salts containing disulfide groups*

Compounds of the formulae,

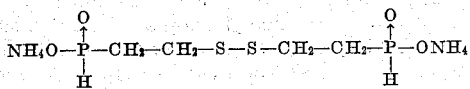

and

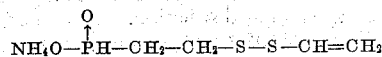

will be prepared by heating a mixture of 1 mole of divinyl disulfide, 2 moles of ammonium hypophosphite and 0.1 mole of di-tertiary-butyl peroxide at 120° C. for about 8 hours. The phosphinate salts produced may be separated as the residue remaining after a vacuum distillation of the reaction products.

*Example XV.—The addition of compounds containing the (H—P→O) group to mixtures of unsaturated compounds*

A. THE ADDITION OF AN ESTER

A mixture of olefins obtained by the cracking of petroleum wax and consisting of compounds containing from eight to eighteen carbon atoms per molecule was employed in the amount of 36.4 g. (about 0.2 mole). The mixed olefins with 66.4 g. (0.4 mole) of dipropyl phosphite and 3.8 mls. (5 mole per cent based on the phosphite) of di-tertiary-butyl peroxide were heated to 130° C. and maintained at that temperature for 16 hours.

The volatile components of the reaction mixture were removed by a vacuum distillation. The mixed dipropyl $C_{8-18}$ alkanephosphonates produced by the reaction were recovered in the form of a slightly viscous oil which had a refractive index of $n_D^{20}$ 1.4602 and which was saturated to bromine in carbon tetrachloride.

B. THE ADDITION OF A SALT

A mixture of olefins obtained by the cracking of petroleum wax and consisting of compounds containing from eight to eighteen carbon atoms was substiuted for 1-octene in the reaction described in Example I.

When the reaction products were diluted with water the mixed sodium $C_{8-18}$ alkanephosphinates so produced separated in the form of a soft waxy solid having good detergent properties.

*Example XVI.—The addition of phosphinates to unsaturated compounds*

A. THE ADDITION OF AN ESTER OF A PHOSPHINIC ACID

A mixture of 0.2 mole of 1-octene and 0.2 mole of ethyl benzenephosphinate with 5 mole per cent of di-tertiary-butyl peroxide was heated to 130° C. and maintained at that temperature for 17 hours.

Prior to heating the mixture consisted of two layers, but by the end of the 17 hours a homogeneous solution was formed. The reaction mixture was washed with 1 molar potassium carbonate solution, to remove any unreacted ethyl benzenephosphinate, and distilled under reduced pressure. The reaction product, the ethyl ester of phenyloctylphosphinic acid, was obtained in a 19% yield and had the following composition:

|  | Found | Calculated for $C_{16}H_{27}O_2P$ |
| --- | --- | --- |
| Percent C | 68.8, 69.2 | 68.1 |
| Percent H | 10.0, 9.9 | 9.6 |
| Percent P | 10.4, 10.5 | 11.0 |
| M. W | 292 | 282 |

B. THE ADDITION OF A SALT OF A PHOSPHINIC ACID

Sodium n-hexane-1-phosphinate was prepared by heating a mixture of 42.4 g. (0.4 mole) of sodium hypophosphite, 50 mls. (0.4 mole) of 1-hexene, 0.426 g. (0.0018 mole) of 2,2-bis(tertiary-butylperoxy)butane and 50 mls. of methanol. The reaction mixture was heated to 125° C. in a stainless steel bomb and maintained at that temperature for 0.75 hour. Under the above conditions the addition reaction is quantitative therefore the bomb contained 0.4 mole of sodium n-hexane-1-phosphinate.

Without removing the contents of the bomb an additional 50 mls. of 1-hexene and 0.426 g. of 2,2-bis(tertiary-butylperoxy)butane were added. The bomb was then maintained at 125° C. for an additional 0.75 hour.

When the reactants were diluted to 500 mls. with water only 20 mls. of the second 50 mls. of 1-hexene separated. The reaction between 1-hexene and sodium n-hexane-1-phosphinate to produce sodium di(n-hexane-1)phosphinate therefore resulted in the conversion of 60% of the 1-hexene employed.

The invention claimed is:

1. A process which comprises heating a mixture of 1-tetradecene and sodium hypophosphite in equimolecular quantities, an amount of methanol corresponding to a volume ratio of olefin to alcohol of from 1:1 to 1:2, and 2,2-bis(tertiary-butylperoxy)butane in an amount corresponding to from 0.5 to 10 mole per cent of the amount of hypophosphite to a temperature between 80° C. and 120° C.

2. A method of preparing diethyl hexane-1-phosphonate and diethyl 2-butyloctane-1-phosphonate comprising heating a mixture of 1-hexene and diethyl phosphite in a mole ratio of olefin to phosphite of from 1:1 to 1:3, di-tertiary-butyl peroxide in an amount corresponding to from 0.5 to 10 mole per cent of the molar amount of phosphite to a temperature between 115° C. and 150° C.

3. A method of preparing dibutyl octane-1-phosphonate and dibutyl 2-hexyldecane-1-phosphonate comprising irradiating with a source of ultraviolet light a mixture of 1-octene and dibutyl phosphite in a mole ratio of olefin to phosphite of from 1:1 to 1:3 and acetone in an amount corresponding to from 0.5 to 10 mole per cent of the phosphite.

4. A process for the preparation of a compound containing the grouping (C—C—P→O) which comprises causing a phosphorus-containing compound containing the grouping (H—P→O) as the only reacting grouping to react with an unsaturated organic compound containing a pair of carbon atoms that are directly interconnected by an olefinic bond by subjecting a reaction mixture comprising said reactants to the action of a free radical reaction initiator.

5. A process for the preparation of a compound containing the grouping (C—C—P→O) which comprises causing a phosphorus-containing compound of the formula

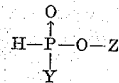

in which Z represents a member of the class consisting of monovalent hydrocarbon radicals free of aliphatic multiple bonds and inorganic cations and Y represents a member of the class consisting of the hydrogen atom, monovalent hydrocarbon radicals free of aliphatic multiple bonds, and —O—Z in which Z is defined as above, to react with an unsaturated organic compound containing a pair of carbon atoms that are directly interconnected by an olefinic bond by subjecting a reaction mixture comprising said reactants to the action of a free radical reaction initiator at a temperature within the range of from about 0° C. to decomposition temperature of the reactants and products.

6. A process for the preparation of a compound containing the grouping (C—C—P→O) which comprises causing a phosphorus-containing compound of the formula

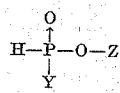

in which Z represents a member of the class consisting of monovalent hydrocarbon radicals free of aliphatic multiple bonds and inorganic cations and Y represents a member of the class consisting of the hydrogen atom, monovalent hydrocarbon radicals free of aliphatic multiple bonds, and —O—Z in which Z is defined as above, to react with an unsaturated organic compound containing a pair of carbon atoms that are directly interconnected by an olefinic bond and containing carbon-to-carbon unsaturation as the only unsaturation in the molecule by subjecting a reaction mixture comprising said reactants to the action of a free radical reaction initiator at a temperature within the range of from about 0° C. to about 200° C.

7. A process defined by claim 6 when conducted in the presence of an added organic peroxide as the free radical reaction initiator.

8. A process defined by claim 6 when conducted in the presence of an added photochemically dissociable compound as the free radical reaction initiator and under the deliberate influence of actinic light to induce photochemical dissociation of said added photochemically dissociable compound.

9. A process for the preparation of a compound containing the grouping (C—C—P→O) which comprises causing a phosphorus-containing compound of the formula

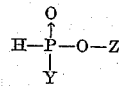

in which Z represents a member of the class consisting of monovalent hydrocarbon radicals free of aliphatic multiple bonds and inorganic cations and Y represents a member of the class consisting of the hydrogen atom, monovalent hydrocarbon radicals free of aliphatic multiple bonds, and —O—Z in which Z is defined as above, to react with an unsaturated organic compound containing a pair of carbon atoms that are directly interconnected by an olefinic bond by heating a reaction mixture comprising said reactants and an added organic peroxide at about the decomposition temperature of said organic peroxide.

10. A process defined by claim 9 when the phosphorus-containing compound is a dialkyl phosphite.

11. A process defined by claim 9 when the phosphorus-containing compound is a salt of hypophosphorous acid and a monovalent cation.

12. A process for the preparation of a diester of an alkanephosphonic acid which comprises causing a diester of phosphorous acid to react with an olefin by subjecting a reaction mixture comprising said diester of phosphorous acid and said olefin to the action of a free radical reaction initiator at a temperature within the range of from about 0° C. to about 200° C.

13. A process for the preparation of a dialkyl 1-alkanephosphonate which comprises causing a dialkyl phosphite to react with a 1-olefin by subjecting a reaction mixture comprising said dialkyl phosphite and said 1-olefin to the action of a free radical reaction initiator at a temperature within the range of from about 0° C. to about 200° C.

14. A process defined by claim 13 when conducted in the presence of an added organic peroxide as the free radical reaction initiator.

15. A process for the production of a salt of a 1-alkanephosphinic acid and a monovalent cation which comprises causing a salt of hypophosphorous acid and a monovalent cation to react with a 1-olefin by subjecting a reaction mixture comprising said salt of hypophosphorous acid and said 1-olefin to the action of a free radical reaction initiator at a temperature within the range of from about 0° C. to about 200° C.

16. A process defined by claim 15 when conducted in the presence of an added organic peroxide as the free radical reaction initiator.

17. A process for the production of a (dialkyl phosphono)-substituted saturated aliphatic alcohol which comprises causing an olefinically unsaturated aliphatic alcohol to react with a dialkyl phosphite by subjecting a reaction mixture comprising said reactants to the action of a free radical reaction initiator at a temperature within the range of from about 0° C. to about 200° C.

18. The process for the preparation of dibutyl 3-hydroxy-propane-1-phosphonate which comprises heating a mixture comprising allyl alcohol and dibutylphosphite in the presence of added ditertiary butyl peroxide at a temperature of about 130° C. and recovering said dibutyl 3-hydroxypropane-1-phosphonate from the resulting mixture.

19. Process for the addition of one mol of an ethylenically unsaturated compound having only ethylenic carbon to carbon unsaturation of one mol of a phosphorus compound having hydrogen on phosphorus but not more than one hydroxyl thereon, wherein the reactants are brought into contact with each other and with a peroxy catalyst and the addition product is isolated.

References Cited in the file of this patent

UNITED STATES PATENTS

| | | |
|---|---|---|
| 2,254,124 | Stevens et al. | Aug. 26, 1941 |
| 2,313,741 | Engelmann et al. | Mar. 16, 1943 |
| 2,402,137 | Hanford et al. | June 18, 1946 |
| 2,439,214 | Lindsey | Apr. 6, 1948 |
| 2,440,800 | Hanford et al. | May 4, 1948 |
| 2,478,390 | Hanford et al. | Aug. 9, 1949 |

OTHER REFERENCES

Page: "Jour. Chem. Soc. (London)," vol. 101 (1912), pgs. 423 to 431.

"Chem. Abstracts," vol. 30 (1946), columns 4813–14. Abstract of orig. publication in U. S. S. R. by Arbuzov et al.